United States Patent [19]
Albert et al.

[11] Patent Number: 6,061,807
[45] Date of Patent: May 9, 2000

[54] METHODS SYSTEMS AND COMPUTER PRODUCTS FOR ERROR RECOVERY OF ENDPOINT NODES

[75] Inventors: Mark Albert, Wake Forest, N.C.; Ray W. Boyles, Merritt Island, Fla.; James L. Hall, Raleigh; Barron Cornelius Housel, III, Chapel Hill, both of N.C.

[73] Assignee: International Business Machines Corporation, Armonk, N.Y.

[21] Appl. No.: 08/884,300

[22] Filed: Jun. 27, 1997

[51] Int. Cl.[7] .................................................. G06F 11/00
[52] U.S. Cl. ...................... 714/3; 714/4; 714/2; 714/6; 714/7; 395/181; 395/182.03; 395/182.02; 395/182.07
[58] Field of Search .............................. 395/181, 182.03, 395/182.02, 182.01, 182.07, 182.11; 714/4, 3, 2, 6, 7, 10, 11, 12

[56] References Cited

U.S. PATENT DOCUMENTS

| | | | |
|---|---|---|---|
| 4,207,609 | 6/1980 | Luiz et al. ............................. | 364/200 |
| 4,586,134 | 4/1986 | Norstadt ................................ | 364/200 |
| 4,610,013 | 9/1986 | Long et al. ............................ | 371/9 |
| 4,823,256 | 4/1989 | Bishop et al. ......................... | 364/200 |
| 4,949,254 | 8/1990 | Shorter ................................. | 364/202 |
| 4,958,273 | 9/1990 | Anderson et al. ..................... | 364/200 |
| 4,969,092 | 11/1990 | Shorter ................................. | 364/200 |
| 4,991,089 | 2/1991 | Shorter ................................. | 364/202 |
| 5,008,805 | 4/1991 | Fiebig et al. .......................... | 364/184 |
| 5,027,269 | 6/1991 | Grant et al. ........................... | 364/200 |
| 5,058,043 | 10/1991 | Sheirik ................................. | 364/550 |
| 5,060,140 | 10/1991 | Brown et al. ......................... | 364/200 |
| 5,062,037 | 10/1991 | Shorter ................................. | 364/200 |
| 5,063,500 | 11/1991 | Shorter ................................. | 395/200 |
| 5,079,740 | 1/1992 | Patel et al. ............................ | 364/900 |
| 5,107,489 | 4/1992 | Brown et al. ......................... | 370/58.2 |
| 5,144,293 | 9/1992 | Rouse .................................. | 340/825.02 |
| 5,182,744 | 1/1993 | Askew et al. ......................... | 370/16 |
| 5,182,751 | 1/1993 | Bales et al. ........................... | 370/110.1 |
| 5,191,651 | 3/1993 | Halim et al. .......................... | 395/200 |
| 5,282,202 | 1/1994 | Bernstein et al. ..................... | 370/94.1 |
| 5,291,597 | 3/1994 | Shorter ................................. | 395/650 |
| 5,386,417 | 1/1995 | Daugherty et al. .................... | 370/54 |
| 5,386,466 | 1/1995 | Bales et al. ........................... | 379/220 |
| 5,396,486 | 3/1995 | Scott .................................... | 370/31 |
| 5,398,329 | 3/1995 | Hirata et al. .......................... | 395/575 |
| 5,412,653 | 5/1995 | Hoppe et al. ......................... | 370/58.2 |
| 5,473,608 | 12/1995 | Gagna et al. ......................... | 370/85.13 |
| 5,473,771 | 12/1995 | Burd et al. ............................ | 395/182.02 |
| 5,481,696 | 1/1996 | Lomp et al. .......................... | 395/500 |
| 5,483,530 | 1/1996 | Davis et al. ........................... | 370/79 |
| 5,493,609 | 2/1996 | Winseck, Jr. et al. ................. | 379/96 |
| 5,517,622 | 5/1996 | Ivanoff et al. ........................ | 395/200.13 |
| 5,673,253 | 9/1997 | Shaffer ................................. | 370/229 |
| 5,901,138 | 5/1999 | Bades et al. .......................... | 370/229 |
| 5,909,550 | 6/1999 | Shankar et al. ....................... | 395/200.57 |

OTHER PUBLICATIONS

*IBM Technical Disclosure Bulletin*, vol. 34, No. 6, Nov. 1991.

*IBM Technical Disclosure Bulletin*, vol. 34, No. 7A, Dec. 1991.

*IBM Technical Disclosure Bulletin*, vol. 38, No. 03, Mar. 1995.

*Primary Examiner*—Norman Wright
*Attorney, Agent, or Firm*—Myers Bigel Sibley & Sajovec; Jerry W. Herndon

[57] ABSTRACT

Methods, systems and computer program products are provided for error recovery in a network having a first application associated with a first endpoint node and a second application associated with a second endpoint node. These methods, systems and computer program products non-disruptively switch the first application associated with the first endpoint node to a third endpoint node arbitrarily selected from existing endpoint nodes when the first endpoint node is no longer available to the second application associated with the second endpoint node. The first application is provided on the third endpoint node in substantially the same state as the first application existed on the first endpoint node prior to the unavailability of the first endpoint node. The present invention is preferably carried out where the endpoint nodes are VTAM facilities. Also, the first and third endpoint nodes are VTAM facilities in the same SYSPLEX.

48 Claims, 13 Drawing Sheets

METHODS SYSTEMS AND COMPUTER PRODUCTS FOR ERROR RECOVERY OF ENDPOINT NODES

FIELD OF THE INVENTION

The present invention relates to computer networks and more particularly relates to error recovery when failures occur at endpoints in a communication network.

BACKGROUND OF THE INVENTION

In recent years there has been a proliferation in the networking of computer systems. The recent expansion of the Internet is just one example of the trend toward distributed computing and information sharing. In most forms of computer or communication networking there are communication paths between the computers in the networks. These paths may include multiple links or hops between intermediate equipment in the path. Thus, a communication may be originated by a first computer at a first endpoint node and pass through several links before reaching the destination computer at a second endpoint node. The control over these communications is typically carried out by some form of networking architecture. Many architectures exist for defining communications between computers in a network. For example, System Network Architecture (SNA) and Transmission Control Protocol/Internet Protocol (TCP/IP) are two examples of existing network architectures.

One existing network architecture for controlling communications between computers is known as Advanced Peer to Peer Networking (APPN). APPN, like many networking architectures, is based upon the transmission of data where a communication is broken into one or more "packets" of data which are then transmitted from the source to the destination over the communication path. Packet based communications allows for error recovery of less than an entire communication which improves communication reliability and allows for packets to take multiple paths to an endpoint destination thus improving communication availability.

While APPN has proven to be a reliable networking architecture, as computer networking demands have increased there has been created a demand for network architectures which utilize the higher performance communication systems and computer systems currently available. These demands have resulted in the development of High Performance Routing which is an enhancement to APPN. The migration from APPN to HPR may be a result of changes in two areas: processing technology and link technology. Processing capability has increased and become less expensive. This has driven the need for larger peer-to-peer networks. Link technology has advanced by several orders of magnitude over the past decade. Advances in wide area links have dramatically increased transmission rates and decreased error rates. Thus, to take advantage of these advances HPR provides high speed data routing which includes end-to-end recovery (i.e. error recovery is performed by the sending and receiving systems) and end-to-end flow and congestion control where the flow of data is controlled by the sending and receiving systems.

HPR includes two main components: the Rapid Transport Protocol (RTP) and automatic network routing (ANR). RTP is a connection-oriented, full-duplex transport protocol designed to support high speed networks. One feature of RTP is to provide end-to-end error recovery, with optional link level recovery. RTP also provides end-to-end flow/ congestion control by an adaptive rate based mechanism (ARB).

One advantage of HPR is its ability to route around failed links in a path. HPR may use alternate paths to bypass failing nodes on a path. This ability gives HPR considerable flexibility in recovering from errors at intermediate nodes. However, if a failure occurs at the endpoint node of a path, either the source or the destination endpoint, HPR alone cannot route around the failed endpoint. Thus, to provide error recovery for failures of an endpoint, the endpoints themselves should provide the error recovery.

Errors at endpoints may generally be categorized as one of two types: errors of applications at an endpoint and error of the endpoint itself. Depending upon the type of endpoint and applications at the endpoint a failure of the application may be recovered. For example, if an endpoint is a Virtual Telecommunications Access Methods (VTAM) facility and the application is a persistence enabled application then failures of the application may be recovered by restarting the application at the state prior to the failure. Such an error recovery method is described in commonly assigned U.S. Pat. No. 5,027,269. However, if the failure is of the endpoint, i.e. a VTAM failure, an operating system failure or a hardware failure, no mechanism currently exists to correct for such failure.

Previously, errors of the endpoints themselves had been dealt with by providing redundant endpoints. A standby processor would be designated and a third party routing node would be utilized to recover connections. A live backup connection would be maintained to the dedicated standby processor. In the event of failure, the third party routing node would aid in establishing the connections to the dedicated standby processor. However, such a solution requires dedicated system resources at the third party routing node and the backup processor as well as requiring the resources of maintaining two connections. Furthermore, in the event of failure of the backup processor there is no further error recovery.

In view of the above discussion, there exists a need for improvement in error recovery from failures at endpoint nodes in a network.

SUMMARY OF THE INVENTION

In view of the above discussion, it is an object of the present invention to provide for recovery of failures of endpoint nodes.

Yet another object of the present invention is to provide error recovery without the need for reserving standby resources.

A further object of the present invention is to provide for rapid recovery of failing endpoints without excessive network re-routing.

Still another object of the present invention is to provide for error recovery of an endpoint without the need for live backup connections to alternate processors.

Another object of the present invention is to provide multiple alternative recovery endpoint nodes for load balancing and increased reliability.

These and other objects of the present invention are provided by methods, systems and computer program products for error recovery in a network having a first application associated with a first endpoint node and a second application associated with a second endpoint node. These methods, systems and computer program products non-disruptively switch the first application associated with the first endpoint node to a third endpoint node selected arbitrarily from existing endpoint nodes when the first endpoint node is no longer available to the second application associated with the second endpoint node. The first application is provided on the third endpoint node in substantially the same state as the first application existed on the first endpoint node prior to the unavailability of the first endpoint node.

Such non-disruptive switching may be accomplished by storing state information associated with the first application and initiating the first application at the third endpoint node utilizing the stored state information associated with the first application. Additionally the path between the second application and the first application may be revised to reflect the first application being associated with the third endpoint node and the second endpoint node informed of the revised path.

Thus, by saving state information for endpoint nodes in a commonly accessible location and then allowing other existing endpoint nodes to utilize the state information to recover from the failure of an endpoint node, the present invention allows for recovery after endpoint failures without requiring dedicated backup nodes. Furthermore, the only overhead associated with the recovery would be the storage of state information related to the application and any sessions associated with the application. Also, because the application is restarted at a point just prior to a failure, there can be minimal delay between detection of a failure of an endpoint and restarting of the application at a new endpoint. Thus, the application may be rapidly recovered.

In a particular embodiment of the present invention, the first endpoint node and the third endpoint node may be nodes within a SYSPLEX. In this situation the state information is stored in a coupling facility of the SYSPLEX. The first endpoint node and the third endpoint node may also be VTAM facilities. In this situation the first application may be initiated on a VTAM facility associated with the third endpoint node.

In another embodiment of the present invention the state information stored in the coupling facility may include HPR-link information, session state information, conversation state and LU Mode Table information. The state information of the first application may be maintained for a predetermined time before it is discarded as no longer needed. Furthermore, the first application is preferably a persistent node application.

In yet another embodiment of the present invention, the unavailability of the first endpoint node is detected. In such an embodiment the other endpoint nodes with access to the state information of the first application may be notified of the failure of the first endpoint node and one of these endpoint nodes may recover the application.

In a particular embodiment of the present invention a first application is non-disruptively transferred from a first VTAM facility to a second VTAM facility. This transfer may be accomplished by storing state information associated with the first application in a coupling facility and then accessing the coupling facility to retrieve the state information associated with the first application. The first application may then be initiated on the second VTAM facility utilizing the state information retrieved from the coupling facility so as to provide the first application on the second VTAM facility in substantially the same state as the first application on the first VTAM facility.

In addition to transferring the first application from the first VTAM facility, the path between a second application and the first application may be revised to reflect the first application being associated with the second VTAM facility. Furthermore, the VTAM facilities with access to the coupling facility may be notified of the failure of a VTAM facility with an associated persistent application.

The current state information for the first application in the coupling facility may further be maintained for a predetermined time or removed from the coupling facility if the first application terminates. Outdated state information may also be removed from the coupling facility.

As will further be appreciated by those of skill in the art, the present invention may be embodied as a method, apparatus or computer program product.

DETAILED DESCRIPTION OF THE INVENTION

The present invention now will be described more fully hereinafter with reference to the accompanying drawings, in which preferred embodiments of the invention are shown. The present invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

Figure 1:
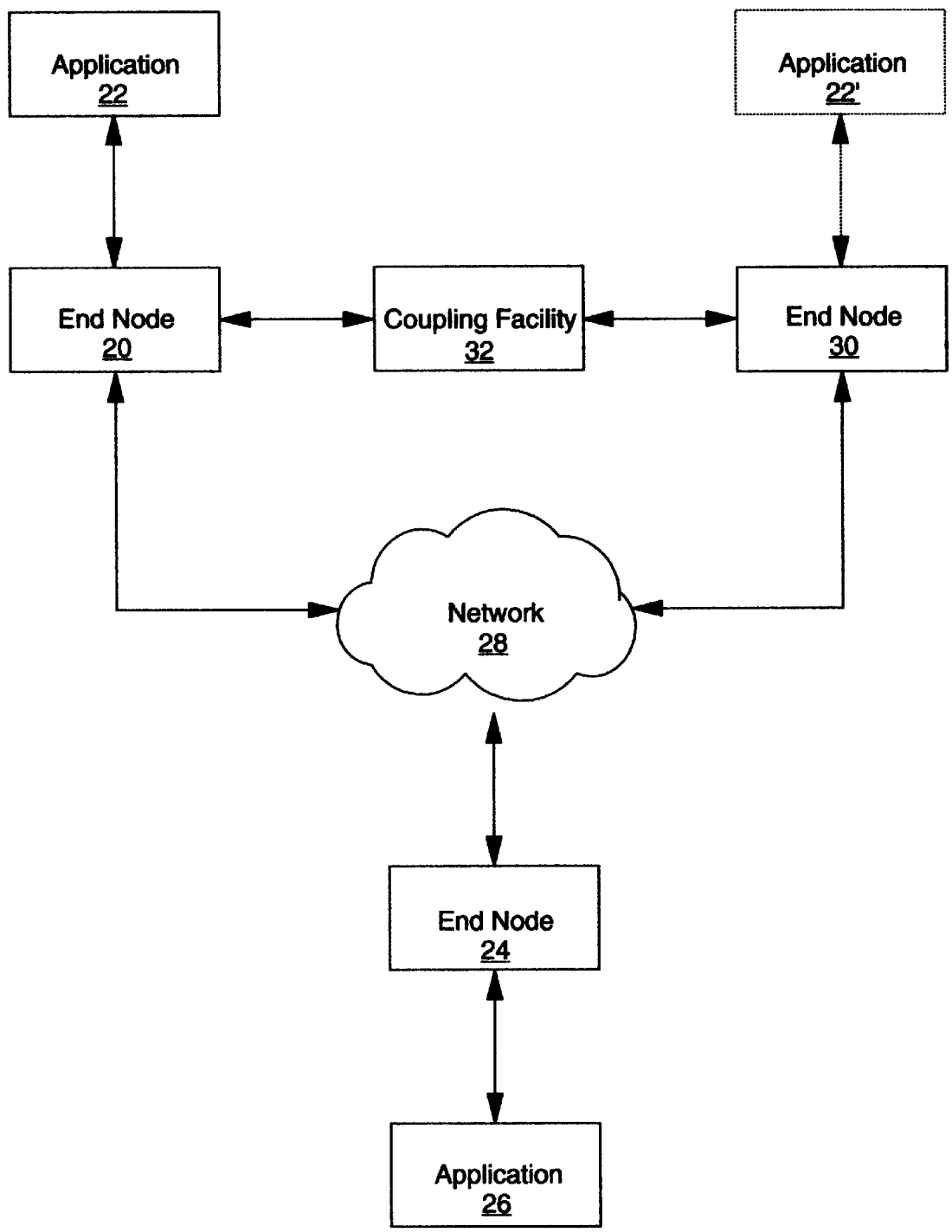
FIG. 1 is block diagram of a network utilizing the present invention.

FIG. 1 illustrates one embodiment of the present invention. As seen in FIG. 1, an endpoint node 20 (also referred to as an "end node") has an associated application 22 which utilizes endpoint node 20 to access a computer network 28.

Endpoint node 20 communicates through network 28 to a second endpoint node 24 which also has an associated application 26. Thus, application 22 at endpoint node 20 may communicate with application 26 at endpoint node 24 through network 28.

FIG. 1 also illustrates a third endpoint node 30 which also has access to network 28 and, therefore, may communicate with endpoint node 24. As is seen in FIG. 1, the first endpoint node 20 may communicate with a coupling facility 32. Similarly, the third endpoint node 30 may also communicate with the coupling facility 32. According to the present invention, the coupling facility 32 may be utilized by endpoint node 20 and endpoint node 30 to store state information regarding endpoint nodes and applications associated with endpoint nodes so as to allow for recreation of the application on any endpoint node with access to the coupling facility 32. Thus, as seen in FIG. 1, application 22 may be recreated at endpoint node 30. The recreated application 22 is illustrated as application 22' in FIG. 1.

The operation of the present invention to recover from errors at an endpoint node will now be described with respect to the network of FIG. 1. In normal operation, application 26 utilizes endpoint node 24 to establish a session with application 22 through endpoint node 20. When endpoint node 20 and application 22 are initiated, state information regarding the endpoint node and the application are stored in the coupling facility 32. As the session between application 26 and application 22 proceeds additional information is stored in the coupling facility such that application 22 could be restarted prior to the point of an error from the stored state information. Thus, endpoint node 20 maintains up-to-date state information in the coupling facility 32 for each persistent application associated with endpoint node 20.

If endpoint node 20 fails, for whatever reason, then application 22 no longer has access to network 28 and can no longer maintain the session with application 26. Through the use of the present invention, the application 22 may be migrated to an arbitrarily selected endpoint node from existing endpoint nodes with access to the network 28. Thus, through network management applications such as NetView, an Automatic Restart Manager or operator intervention, the application 22 may be restarted on any available endpoint node with access to the network. Such a selection may be arbitrarily made from the endpoint nodes with access to the coupling facility 32. Thus, upon the restart of application 22 as application 22', endpoint node 30 accesses the coupling facility 32 to obtain the state information of endpoint node 20 and application 22. Application 22 is recreated at endpoint node 30 as application 22, in the state prior to the failure of endpoint node 20 and reestablishes the session with application 26 through network 28. Endpoint node 30 may then also notify network 28 of the change in the path between application 22, and application 26. Thus, through the use of the present invention, the session between application 22 and application 26 may be non-disruptively transferred from endpoint node 20 to endpoint node 30.

Endpoint node 30 may also be notified of the failure of another endpoint node with access to the coupling facility. Endpoint nodes with access to the coupling facility may then determine if the applications identified in the coupling facility have been restarted and, if not, may ultimately "clean up" outdated entries in the coupling facility. Endpoint nodes may be informed of the failure of an endpoint node by any number of mechanisms, including by the coupling facility, network management software or a common operating system. As will be appreciated by those of skill in the art, other methods of informing endpoint nodes associated with the coupling facility 32 of a failure of an endpoint node associated with the coupling facility 32 may also be utilized.

Furthermore, FIG. 1 illustrates a coupling facility with two associated endpoint nodes. However, as will be appreciated by those of skill in the art, any number of endpoint nodes may have access to the coupling facility and, therefore, provide error recovery capabilities for the other endpoint nodes with access to the coupling facility. Access to the coupling facility may be provided by any commonly accessible location such as common memory, common storage or other methods known to those of skill in the art. Furthermore, while it is preferable that endpoint nodes utilizing a coupling facility have commonly shared hardware, such as being implemented in a Systems Complex (SYSPLEX), the teachings of the present invention may also be applicable to less closely coupled hardware and software as long as access to the state information in the coupling facility may be achieved.

The selection of the recovering endpoint node from the existing endpoint nodes may be accomplished by any number of methods including automated methods or operator intervention. For example, a round-robin assignment of applications to existing nodes for recovery could be utilized. Other techniques known to those of skill in the art, such as load balancing may be utilized to dynamically select the recovering endpoint node from existing endpoint nodes. However, whatever method of allocation of applications to recovering nodes, only one endpoint node should be utilized to recover an application.

The present invention will now be described with respect to FIG. 2, FIG. 3 and FIG. 4 which are flowcharts illustrating the operation of endpoint nodes utilizing the present invention. It will be understood that each block of the flowchart illustrations, and combinations of blocks in the flowchart illustrations, can be implemented by computer program instructions. These program instructions may be provided to a processor to produce a machine, such that the instructions that execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions.

Figure 2:
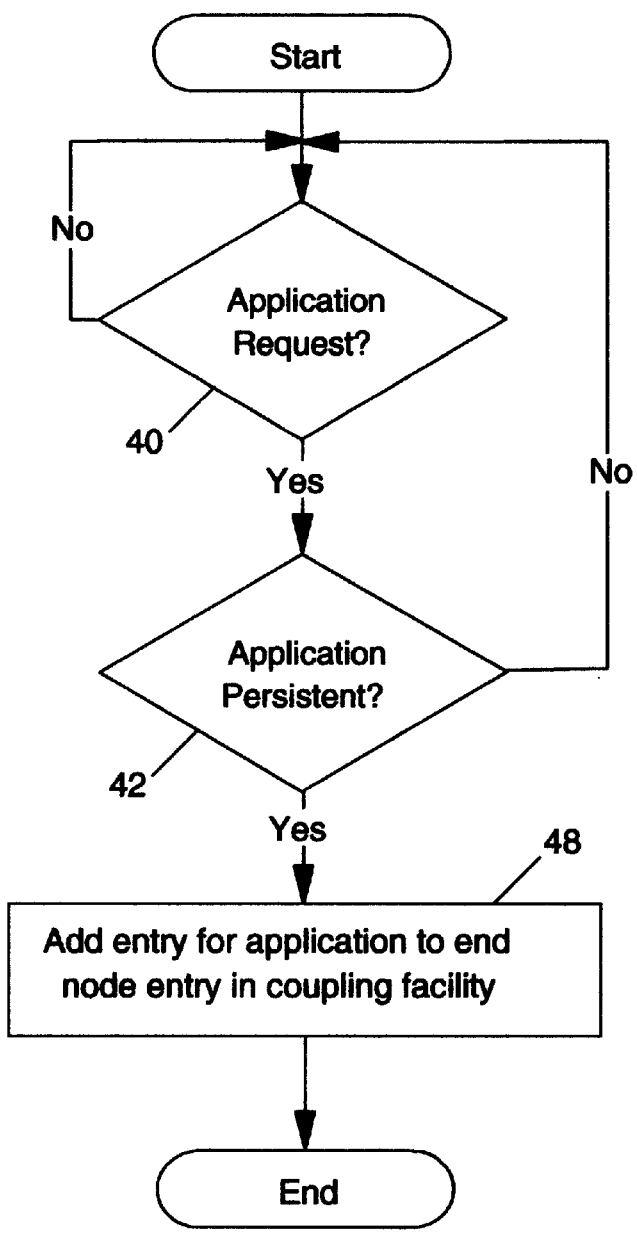
FIG. 2 is a flowchart illustrating the operations of an endpoint node during initiation of an application using the endpoint node according to the present invention.

FIG. 2 illustrates the initiation of an application at an endpoint node utilizing the present invention. As seen in FIG. 2, an endpoint node waits for a request to be utilized by an application (block 40). One such request may be for the creation of a session between application 22 and application 26 over network 28. When an application is initiated using the endpoint node, such as endpoint node 20, the endpoint node determines if the application is enabled for multiple node persistence (block 42). A multiple node persistence enabled application is an application that will continue operation after a failure of the endpoint node by transfer to another endpoint node. If the application being initiated is not a multiple node persistence enabled application then the endpoint node waits for the next application request (block 42).

If, however, the application being initiated is enabled for multiple node persistence, then the endpoint node adds to the coupling facility an entry identifying the application and providing state information for the application (block 48). In the present example, where the application 22 has established a session with application 26, information regarding the session and the path between endpoint node 20 and endpoint node 24 is also provided to the coupling facility 32 to reestablish the session between application 22 and application 26. Such a process is illustrated in FIG. 3.

Figure 3:
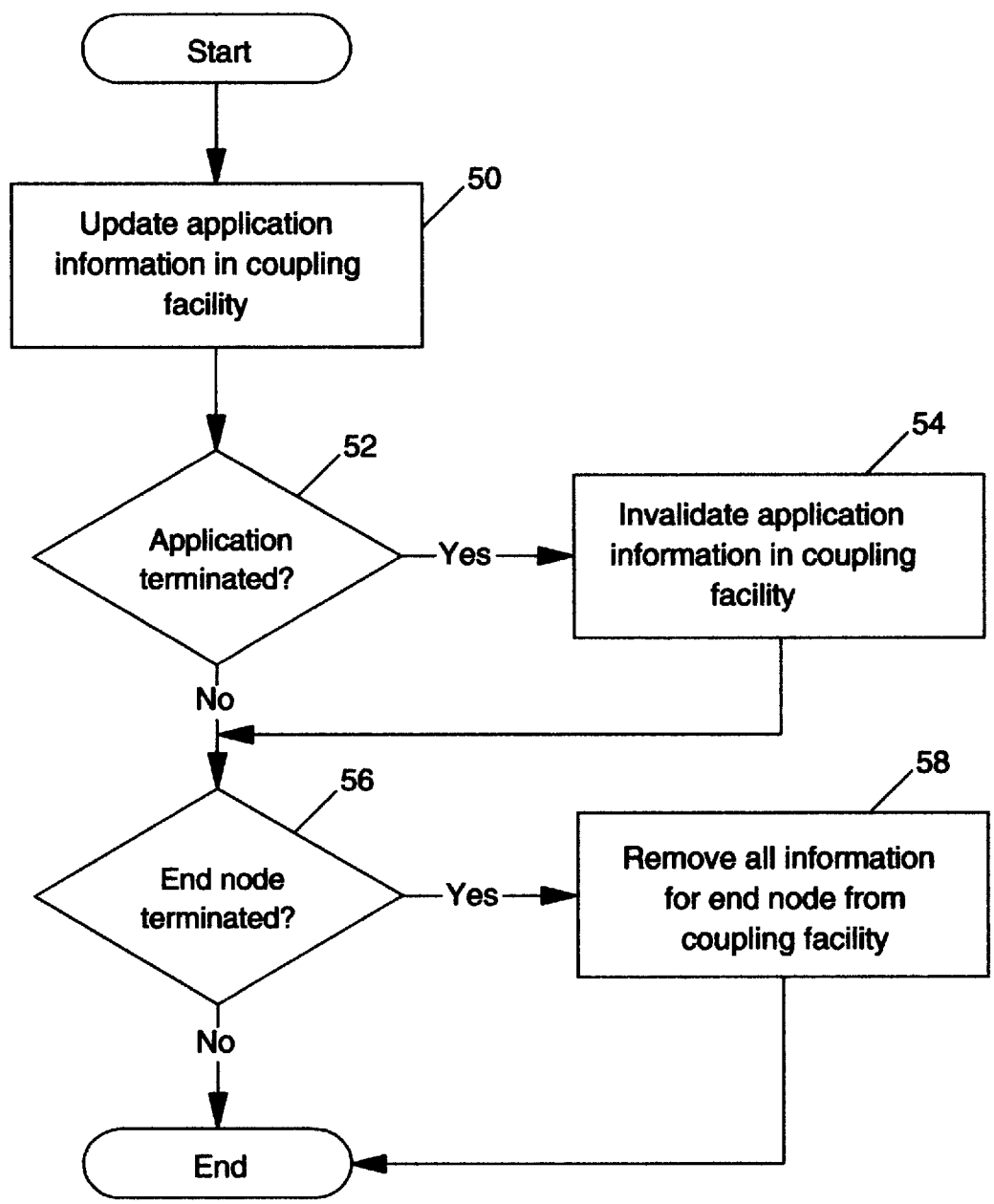
FIG. 3 is a flowchart illustrating the steady-state operation of an endpoint node according to the present invention.

FIG. 3 illustrates the operation of the endpoint node 20 with respect to the coupling facility 32 during normal operation. When the application sends or receives data or otherwise changes state the endpoint node updates the coupling facility with the latest application information (block 50). The endpoint node also determines if the application is terminated normally (block 52) and invalidates the information for the application in the coupling facility if the application is so terminated (block 54). Finally, the endpoint node determines if it is to terminate (block 56) and removes the information associated with the endpoint node from the coupling facility if the endpoint node is terminated (block 58).

Figure 4:
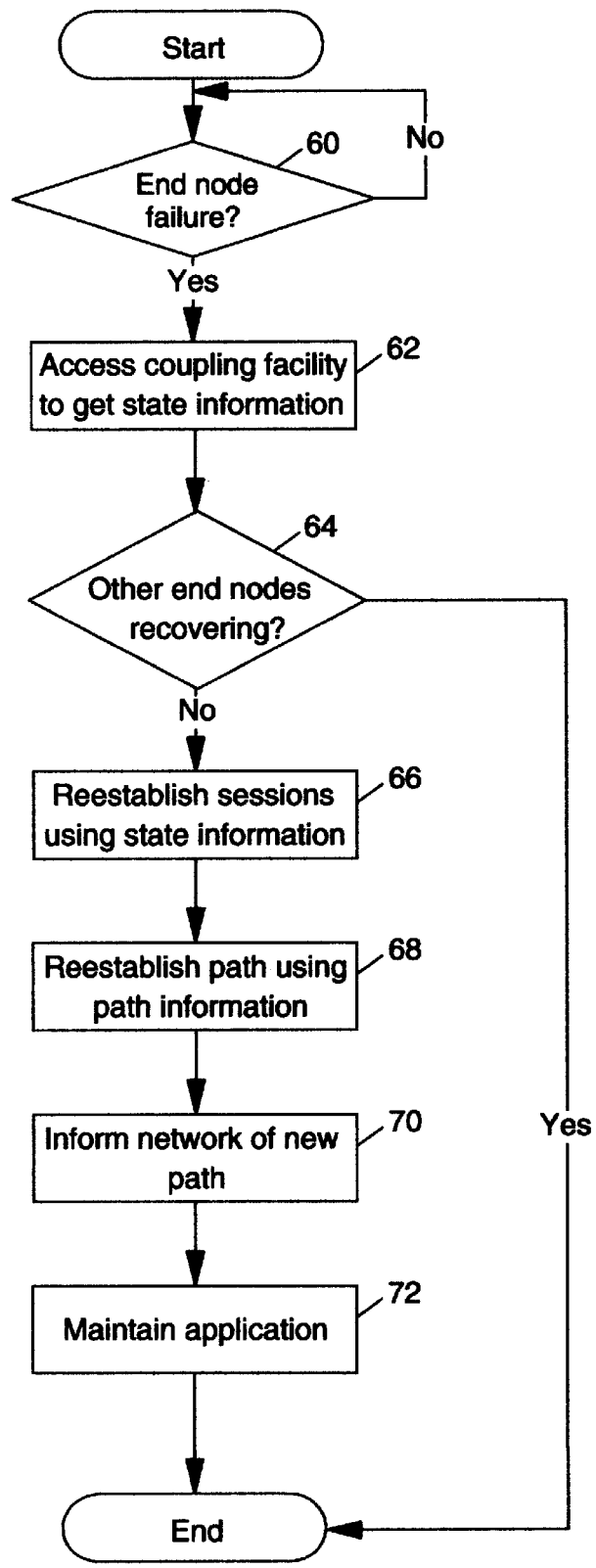
FIG. 4 is a flowchart illustrating the recovery of an application on an endpoint node utilizing the present invention.

FIG. 4 illustrates the error recovery sequence for an endpoint node with access to coupling facility 32. As seen in FIG. 4, the endpoint nodes with access to coupling facility 32 wait for a failure of one of the other nodes with access to the coupling facility (block 60). As discussed above, the endpoint nodes may be notified of the failure of another endpoint node by any of a variety of mechanisms. However an endpoint node is notified of an endpoint node failure, upon such a failure the endpoint node accesses the coupling facility 32 to obtain the state information for applications associated with the failing endpoint node (block 62). If another endpoint node is recovering the application associated with the failing endpoint node then the endpoint node does not recover the application (block 64).

However, through whatever selection process, ultimately, if an endpoint node has the application 22' restarted on the endpoint node then the endpoint node carries out the remaining operations of FIG. 4. As discussed above, such a restart of the application may be handled by an Automatic Restart Manager or by NetView automation procedures or other such error recovery procedures. After the application is restarted, information obtained from the coupling facility (block 66) is used to reestablish sessions of the application 22'. The endpoint node also reestablishes the path associated with the application (block 68) and informs the network 28 of the new path to the application 22' (block 70). The new endpoint node 30 then maintains the reestablished application 22' (block 72) as illustrated in FIG. 3.

Thus, through the use of the present invention, a session between applications may be maintained despite the failure of an endpoint node of the session. The session may be maintained nondisruptively by any endpoint node having access to the coupling facility without dedicating specific endpoint node resources to act as a standby node and without the intervention of a third party application to switch from a primary endpoint node to a secondary endpoint node. Each endpoint node with access to the coupling facility may act to reestablish sessions associated with a failing endpoint node through accessing the state information stored in the coupling facility. Accordingly, no additional nodes are required solely for backup as each existing endpoint node may act as a backup for the other endpoint nodes.

The present invention has been described above generically with respect to endpoint nodes and a coupling facility. As will be appreciated by those of skill in the art, these endpoint nodes may be any form of processing system which may be networked, however, preferably the endpoint nodes are instances of a Virtual Telecommunication Access Methods (VTAM) facility. An embodiment of the present invention where the endpoint nodes are VTAM endpoint nodes and where the coupling facility and the VTAM endpoint nodes reside in a MVS SYSPLEX will now be described with respect to FIGS. 5 through 11. In a VTAM environment, the present invention may be described as multiple node persistent sessions (MNPS) as the present invention utilizes multiple endpoint nodes to maintain a persistent session.

Figure 5:
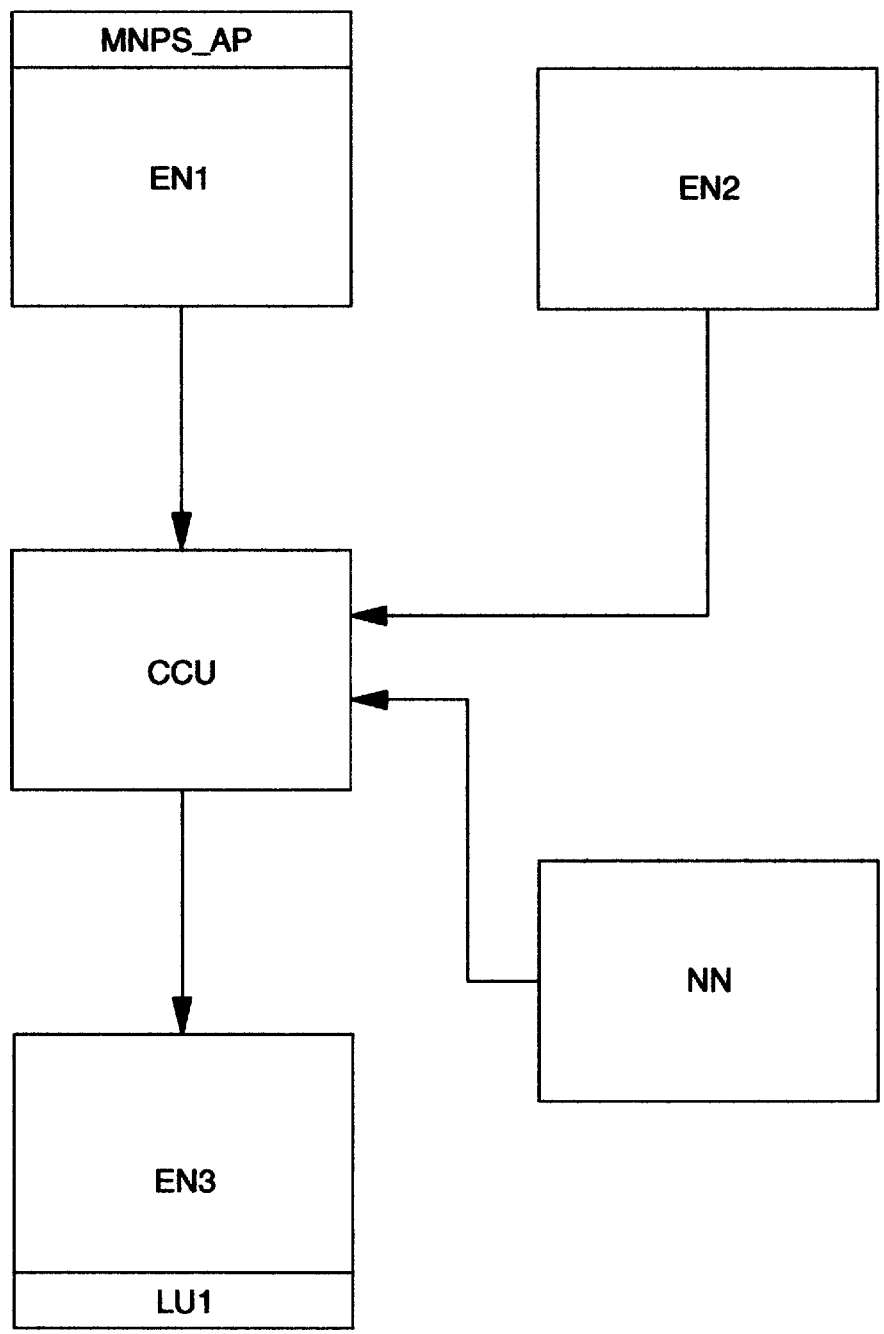
FIG. 5 is a block diagram of a VTAM embodiment of the present invention.

FIG. 5 illustrates the basic elements of the present invention in a VTAM environment. FIG. 5 illustrates a VTAM node (EN1) with an application (MNPS_AP) that supports persistent sessions running on EN1. EN1 is connected to a Communication Control Unit (CCU) which connects through a network to an endpoint node (EN3) in the network with a logical unit (LU1), e.g. a terminal or application, which is in session with the application on EN1. Also in the system is a VTAM node (EN2) in the same SYSPLEX as EN1 and also connected to the CCU. A High Performance Routing Network Node (NN) is also included which may provide a Rapid Transport Protocol (RTP) connection to EN1 and EN2.

Figure 6:
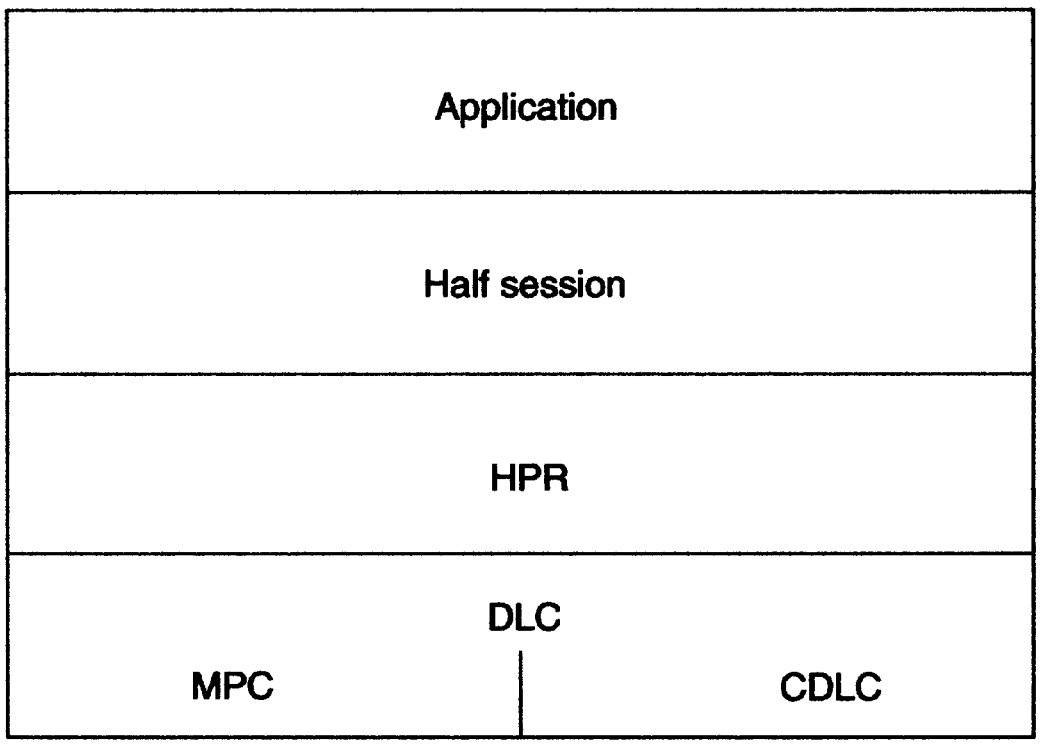
FIG. 6 is a layer diagram of the VTAM structure.

A conceptual model of VTAM is illustrated in FIG. 6. The Link Control DLC layer receives bytes from the I/O subsystem and delivers the Network Layer Packets (NLP) to the HPR layer. The HPR layer maintains the RTP protocols and delivers Path Information Units (PIUs) to the Half-Session layer which maintains session-level protocols and delivers the data to the application. When sending data, each layer performs the necessary protocol maintenance and delivers the data to the next lower level.

In a VTAM embodiment, the present invention utilizes the persistent session capabilities of VTAM (referred to herein as single node persistent sessions) and distributes this capability across multiple VTAM nodes. Single node persistent sessions refers to the ability of VTAM to restart a failing application "in place" and restore the sessions of that application. Such a persistent session is described in commonly assigned U.S. Pat. No. 5,027,269, the disclosure of which is incorporated herein by reference as if set forth fully. The present invention allows the ability to restart an application utilizing a VTAM node by other VTAM nodes by providing the state information utilized to maintain a persistent application in a SYSPLEX Coupling Facility. VTAM exploits the SYSPLEX Coupling Facility (CF) to maintain session and connection information for all persistent sessions. Information maintained in the CF by VTAM in the failing system will be used by the recovering VTAM to restore the network connections and application sessions in the recovered application.

In summary, on detection of a failure of the active node, the sessions are suspended pending recovery of the application. Tracking of Request/Response Unit (RU) data in transit continues but the data itself may be either discarded or retained for subsequent delivery depending on the capabilities of the adjacent node. The application is then restarted on an alternate VTAM node. The alternate application will identify itself to VTAM by opening its Access method Control Block (ACB). VTAM retrieves information about this application's sessions and related network connectivity from the CF. This retrieved information is then used by VTAM in the alternate node to rebuild session control blocks and then information will be relayed to the alternate application utilizing the same interface utilized for single node persistent sessions. The Logical Unit Logical Unit (LU-LU) sessions themselves are also restored using the single node persistent sessions interface. VTAM also sends the appropriate route information to the session partners to inform them of the application's new location.

During normal operation when data is received by VTAM for a persistent application, the current state of the session and, optionally, the data, are saved in the CF. Similarly, when data is sent by a persistent application, the data and the state are saved in the CF.

The present invention is applicable to LU-LU sessions having session partners which are network attached, which are other LU's in the SYSPLEX or which are other LU's in the system. If the session partners are network connected then they should be connected through a High Performance Routing (HPR) node such that a Rapid Transport Protocol (RTP) connection may be made to the VTAM of the persistent application. Because of the variety of session partners which may be utilized with the present invention, it may be desirable to maintain "RTP-like" status information for each partner. When the partner is a persistent application and both applications are on the same VTAM this information may be utilized in recovery if the partners are not restarted on the same VTAM. Furthermore, it may also be unnecessary to maintain information on a non-persistent partner as the session will terminate when the partner terminates. A partner on a different VTAM in the SYSPLEX may be treated as if the partner LU was not in the SYSPLEX.

As described above, according to the present invention, VTAM maintains the current state of each session, including RTP-related information, in the CF. The data should be maintained in a structure such that all information related to a specific application can be retrieved later by any VTAM in the SYSPLEX. The CF data is preferably kept in a self-describing vector format with data item descriptors and length fields. Such a data structure is illustrated in FIG. 7.

Figure 7:
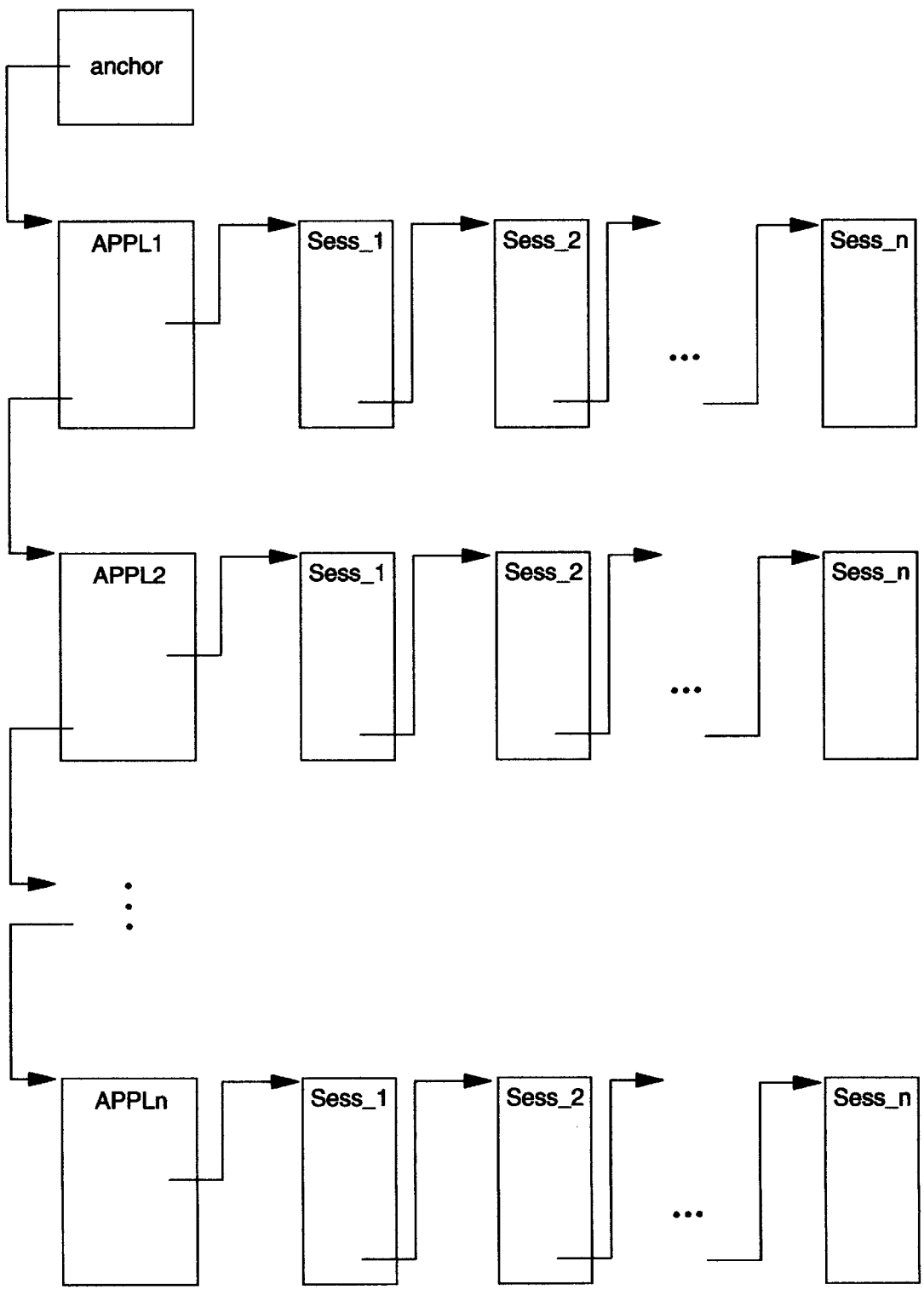
FIG. 7 illustrates a possible data structure in the coupling facility of one embodiment of the present invention.

As seen in FIG. 7, the application name may be used as a "search key" to find the information associated with the application. This is beneficial because when the application is re-started only the name of the application is known by VTAM. Once the structure representing the application is found, the structure points to the status of each session associated with that application. Thus, as seen in FIG. 7, APPL1 points to its related session Sess_1 which points to Sess_2 and so on for each session associated with APPL1. Similarly, APPL2 points to Sess_1 for APPL2 which then points to subsequent session associated with APPL2.

Figure 8:
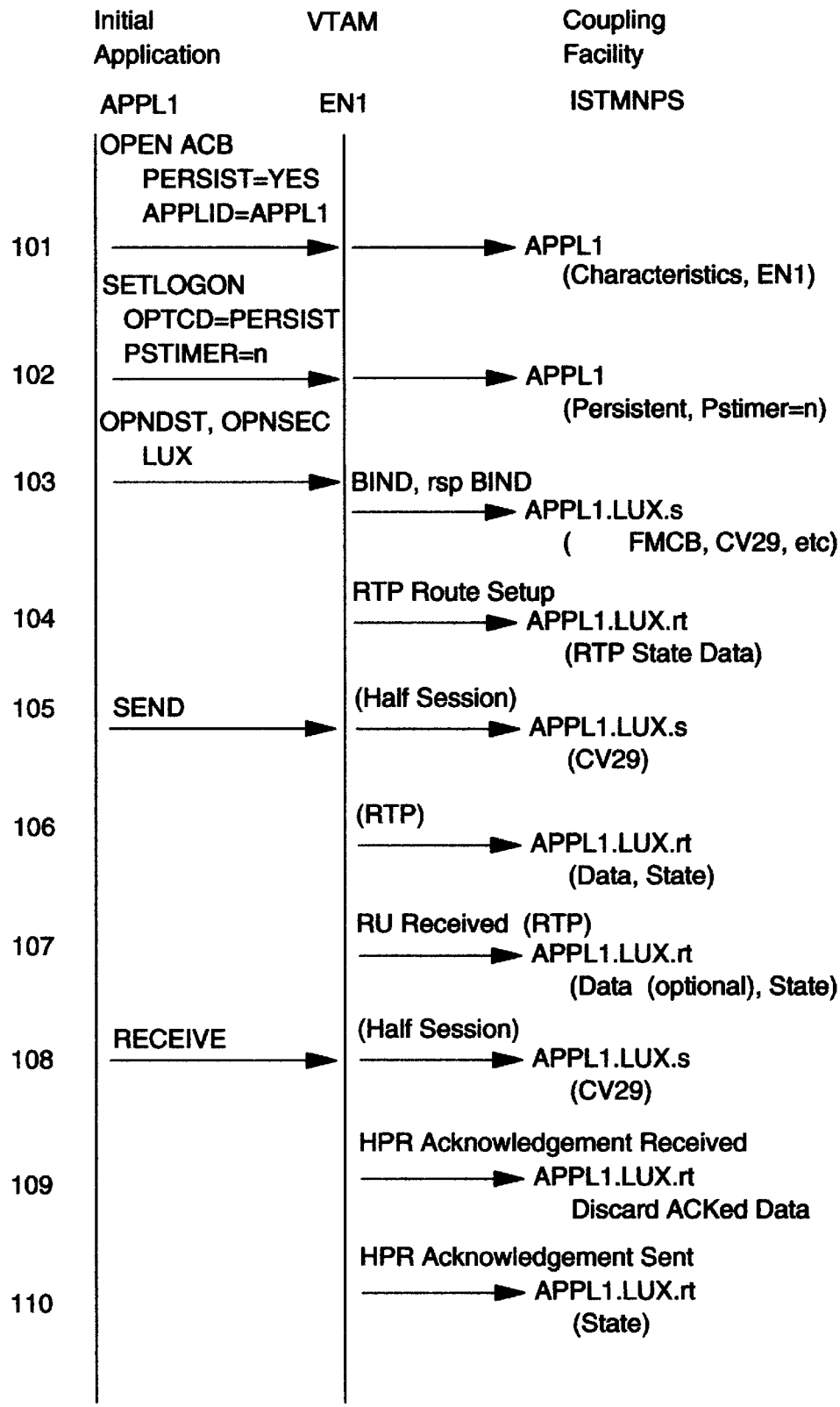
FIG. 8 is a flow diagram illustrating the creation and maintenance of entries in the coupling facility.

FIG. 8 describes how the various entries in the list structure (ISTMNPS) of FIG. 7 are created and maintained in the CF. FIG. 8 illustrates the actions of the application (APPL1) and VTAM (EN1) in creating the list (ISTMNPS) in the CF. The various actions are listed as 101 through 110 in FIG. 8.

As seen in FIG. 8, entry 101 illustrates the initial entry for an application which is created in the CF during the completion of a successful OPEN ACB when persistence is specified. The entry contains the name of the application the CP name of the host node and the specified characteristics of the application. This entry will also be used to save subsequent changes in the applications status. It is desirable to name this entry so that it can be accessed from the coupling facility directly. One way to do this is to name the entry by its application name.

When the application enables persistence using SETLOGON PERSIST, this state must be reflected in the application entry in the CF. Thus, as seen in entry 102, the application is identified as persistent and the Persistent Session (PS) timer value is added to the application entry if one is specified.

Entry 103 of FIG. 8 reflects the initiation of an LU-LU session by OPNDST or OPNSEC. These requests can be issued by the application directly (RAPI) or on behalf of the application (VTAM). During the session initiation process (BIND sent or received), information from the LU-LU session control blocks is written to the CF so that these control blocks may be reconstructed following a failure. The session entry should also contain the name of the partner LU (as specified by the application) and should be directly accessible.

As a result of the BIND request for an LU-LU session, an RTP connection will be requested to facilitate the BIND flow. During the route setup and connection setup process an entry is created in the CF to describe the route. The creation of this entry is reflected in entry 104 of FIG. 8. Sufficient information should be stored to reconstruct the route following a failure. This information should also be directly accessible.

When data is sent on an LU-LU session, the session state is updated to reflect this data as is seen in entry 105. After the LU-LU data flows out of the half-session layer it will pass through the HPR layer. As seen in entry 106, this data is retained in the CF until the RTP partner has acknowledged its receipt. Furthermore, the RTP state changes are also written to the CF.

As is reflected in entry 107, on receipt of inbound LU-LU data, sufficient state information is saved in the CF so that the resultant LU-LU session states can be determined following a failure. Optionally, all of the inbound data could be saved until it has been received by the application.

Entries 108, 109 and 110 reflect that any time data is received on an LU-LU session or an HPR acknowledgment sent, the session state is updated to reflect this data. Furthermore, entry 109 shows that when an HPR acknowledgment is received from the RTP partner the acknowledged data may be discarded from the CF.

Figure 9:
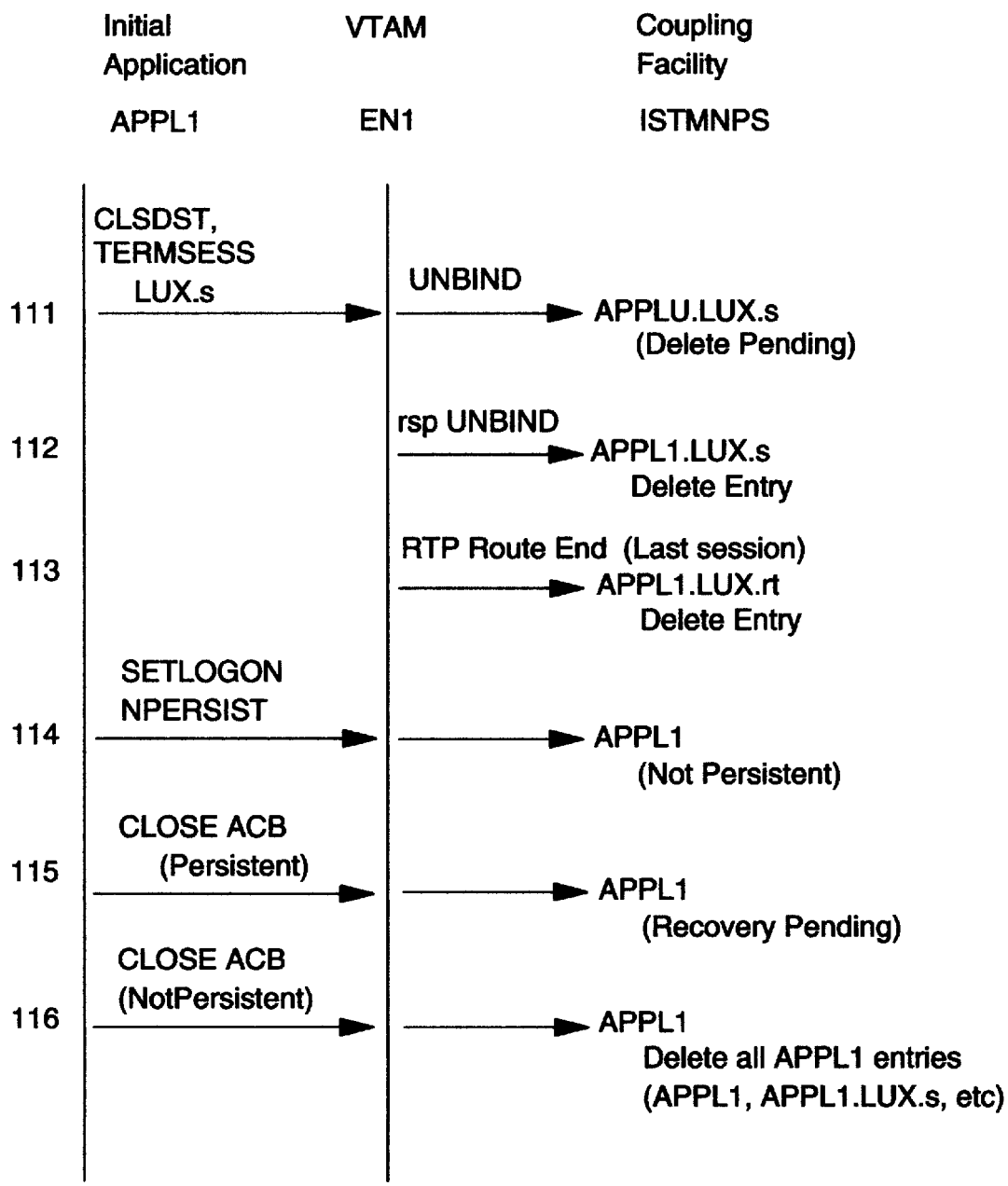
FIG. 9 is a flow diagram illustrating coupling facility access to remove entries from the coupling facility.

FIG. 9 describes how the various entries in the list structure (ISTMNPS) of FIG. 7 are deleted from the CF. FIG. 9 illustrates the actions of the application (APPL1) and VTAM (EN1) in deleting entries from the list (ISTMNPS) in the CF. The various actions are listed as 111 through 116 in FIG. 9.

As is seen in entry 111, during session termination, which can be initiated using CLSDST or TERMSESS, an UNBIND is sent or received. The associated session entry must be changed to the delete-pending state. An LU-LU session entry can then be deleted once an UNBIND response has been sent or received (entry 112). Once all LU-LU sessions using a route have ended, the route itself is disconnected. When the route is disconnected, the route entry can be deleted from the CF (entry 113).

When an application disables persistence using SETLOGON NPERSIST, the state is reflected in the application entry in the CF (entry 114). Similarly, as is seen in entry 115, when a CLOSE ACB is issued for an application and persistence is enabled, the application entry is changed to the recovery pending status. Finally, as reflected in entry 116, when a CLOSE ACB is issued for an application and persistence is not enabled, the application entry and all related entries are deleted.

Figure 10:
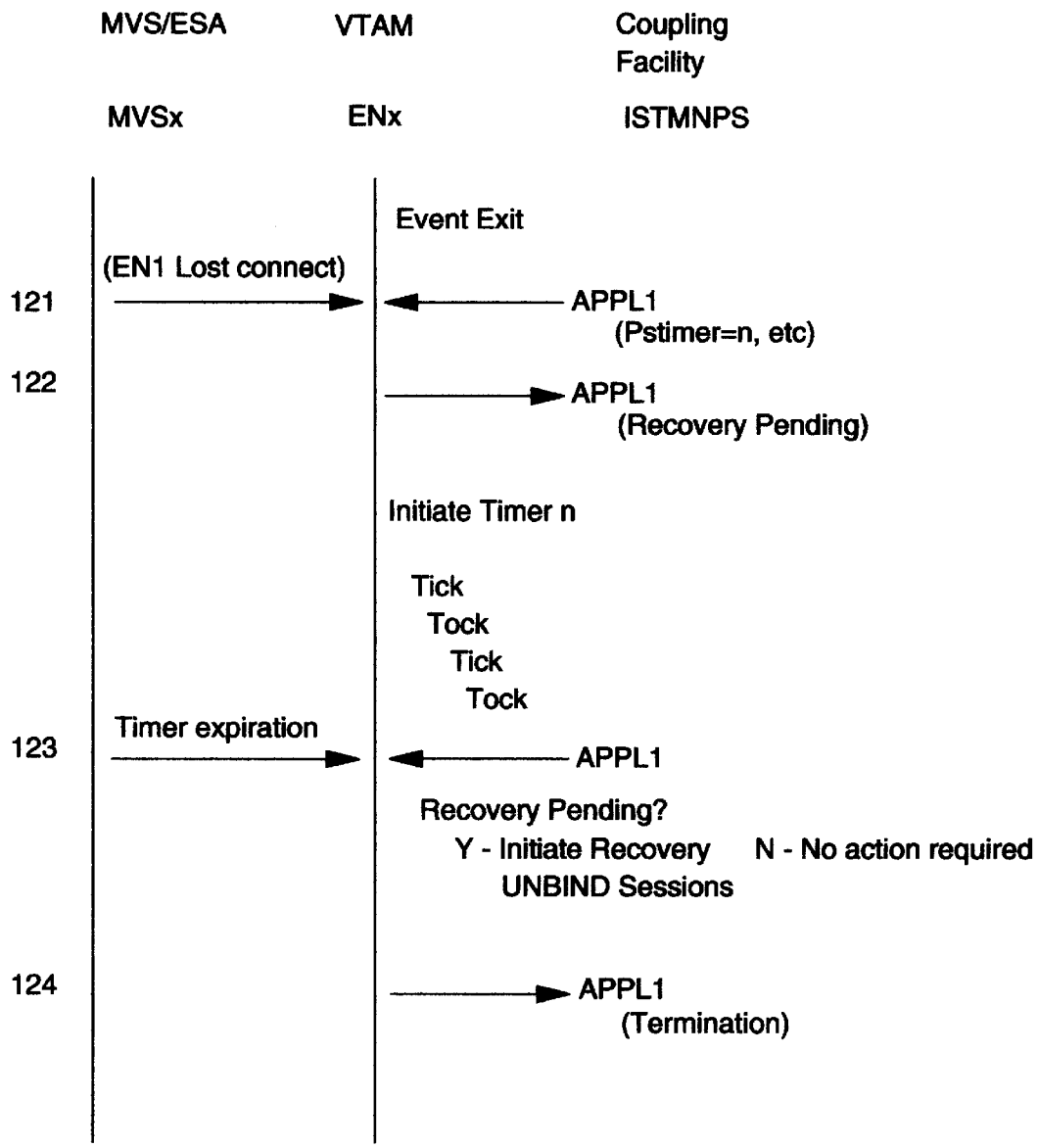
FIG. 10 is a flow diagram illustrating operations during a system failure.

FIG. 10 describes how the various entries in the list structure (ISTMNPS) of FIG. 7 are changed as a result of a failure of VTAM, MVS or hardware. FIG. 10 illustrates the actions of MVS (MVSx) and VTAM (ENx) in changing the list (ISTMNPS) in the CF. The various actions are listed as 121 through 124 in FIG. 10.

As is seen in entry 121, when an endpoint node fails, MVS Coupling Facility Services notifies every VTAM connected to the MNPS structure of that failure through the Event Exit. Each VTAM then reads all application entries associated with the failed endpoint node. The state of an application reflected in the CF is changed to recovery pending and each VTAM initiates a PS timer if one has previously been specified by the application (entry 122). When the PS timer expires on each VTAM, the application entry must be read to determine the current application state (entry 123). If the application state is not recovery pending then no further action is required. If the application state remains recovery pending then one VTAM becomes responsible for the application (entry 124). This VTAM is reflected in the application entry in the CF and becomes responsible for terminating all sessions. To terminate all sessions the new VTAM initiates recovery on behalf of the application and UNBINDs all the LU-LU sessions which will result in the deletion of the application and all associated entries. This process is essentially a normal recovery followed by a non-persistent CLOSE ACB.

Figure 11:
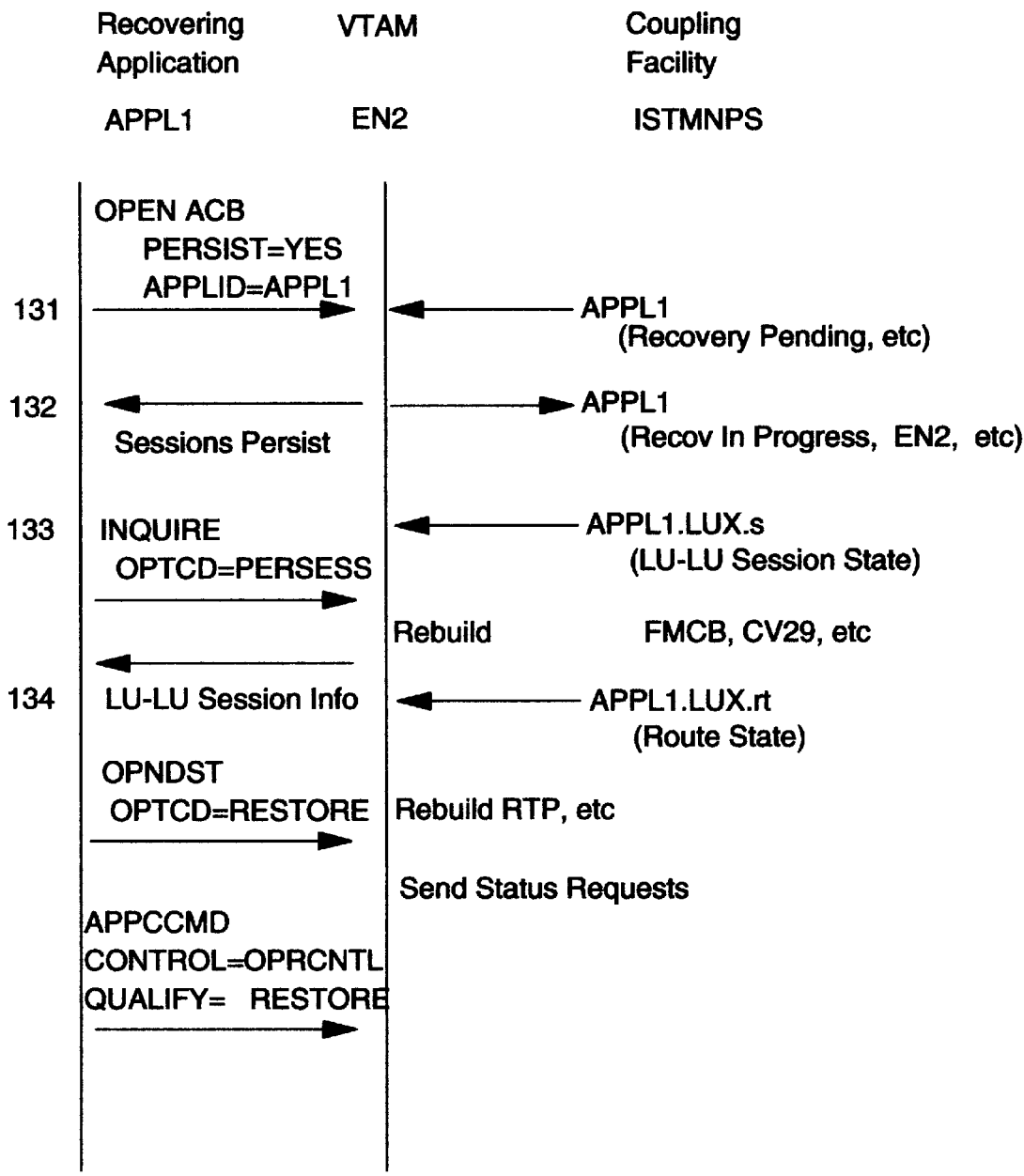
FIG. 11 is a flow diagram illustrating use of the coupling facility to reconstruct sessions on a recovery endpoint node.

FIG. 11 describes how the various entries in the list structure (ISTMNPS) of FIG. 7 are used to reconstruct both the LU-LU session and HPR environments following the recovery of a persistent application. FIG. 11 illustrates the actions of the application (APPL1) and VTAM (EN2) in utilizing the list (ISTMNPS) in the CF. The various actions are listed as 131 through 134 in FIG. 11.

After the failing application has been restarted on another system and has a re-OPENed ACB, VTAM will read its entry in the CF (entry 131). If the application state is recovery pending the application state will be changed to recovery in process and set the location to the recovering VTAM (entry 132). Once this state change has been successfully accomplished, the OPEN ACB can complete with the indication that the application is persistent. The application can then issue INQUIRE to obtain its LU-LU session information. However, the INQUIRE request cannot complete until the LU-LU session states have been reconstructed.

Entry 133 reflects the reading of the session information. All LU-LU session entries are read in order to rebuild the VTAM control blocks which represent these sessions. These control blocks must be integrated into the set of control blocks which already exist on the recovering endpoint node. Once the LU-LU session environment has been reconstructed, an outstanding INQUIRE PERSESS request can be completed. At this point the application can issue OPNDST RESTORE to restore its sessions. For APPC/VTAM sessions the INQUIRE PERSESS step is not require. These sessions can be restored by issuing APPCCMD RESTORE. As with INQUIRE, if APPCCMD RESTORE is issued it should not complete until the LU-LU session states have been reconstructed.

In entry 134, all the route entries are read and the RTP control blocks rebuilt in a manner similar to that for the LU-LU sessions. After the RTP control blocks have been rebuilt, status requests can be sent as needed on each of the recovered routes. The status requests will include new ANR labels in addition to other data.

The rebuilding of the LU-LU sessions and the routes is preferably carried out asynchronously and concurrently. Once the LU-LU sessions and the routes are recovered they may then be interconnected.

The state information that should be maintained in the coupling facility includes HPR-link information, session state information, conversation state information and LU mode table information. The aspects to be saved of each of these types of information is described more fully below.

The HPR-link information to be saved should include RTP state data. This data should include HPR packet (NLP) data such as the packet status/count to/from the RTP partner, packet data unacknowledged by the partner, packet count/status to/from the MNPS half-session and data stored in the receive/transmit queues. ARB data should also be stored including network queueing times, rate data, accumulated transmission time, etc. The RTP data stored should also include origin and destination TCIDs, the session address, session FQPCID-LU mapping for all sessions, forward and/or reverse ANR data, local and remote NCEs and the RTP partner CPname. Partner MNPS identification and the PLU and SLU names may also be stored if both partners in a session are MNPS applications. Finally, the local and external RSCVs for forward and reverse directions, the RTP COS/TPF, an identifier for MNPS RTP connections and RTP deactivation responsibility should also be stored.

For all active LU-LU sessions With a persistent application, sufficient information from the half-session control blocks should be saved in the CF to facilitate recovery of that session following a failure. When a BIND request is sent or received, the information from the half-session control blocks should be saved in the CF so that termination of that session can be accomplished if a failure occurs for that session before that session becomes active. The information about sessions saved for SNPS should also be saved. Optionally, Crypto session keys may also be saved as well as sufficient RACF data to reinstate the security environment during recovery.

VTAM conversation states may also be saved so that conversations can be allocated following a failure and recovery. Included in these states are the begin and end syncpoint states. VTAM application requests which result in changes to the LU mode table should also be saved so that the table can be reconstructed.

Figure 12:
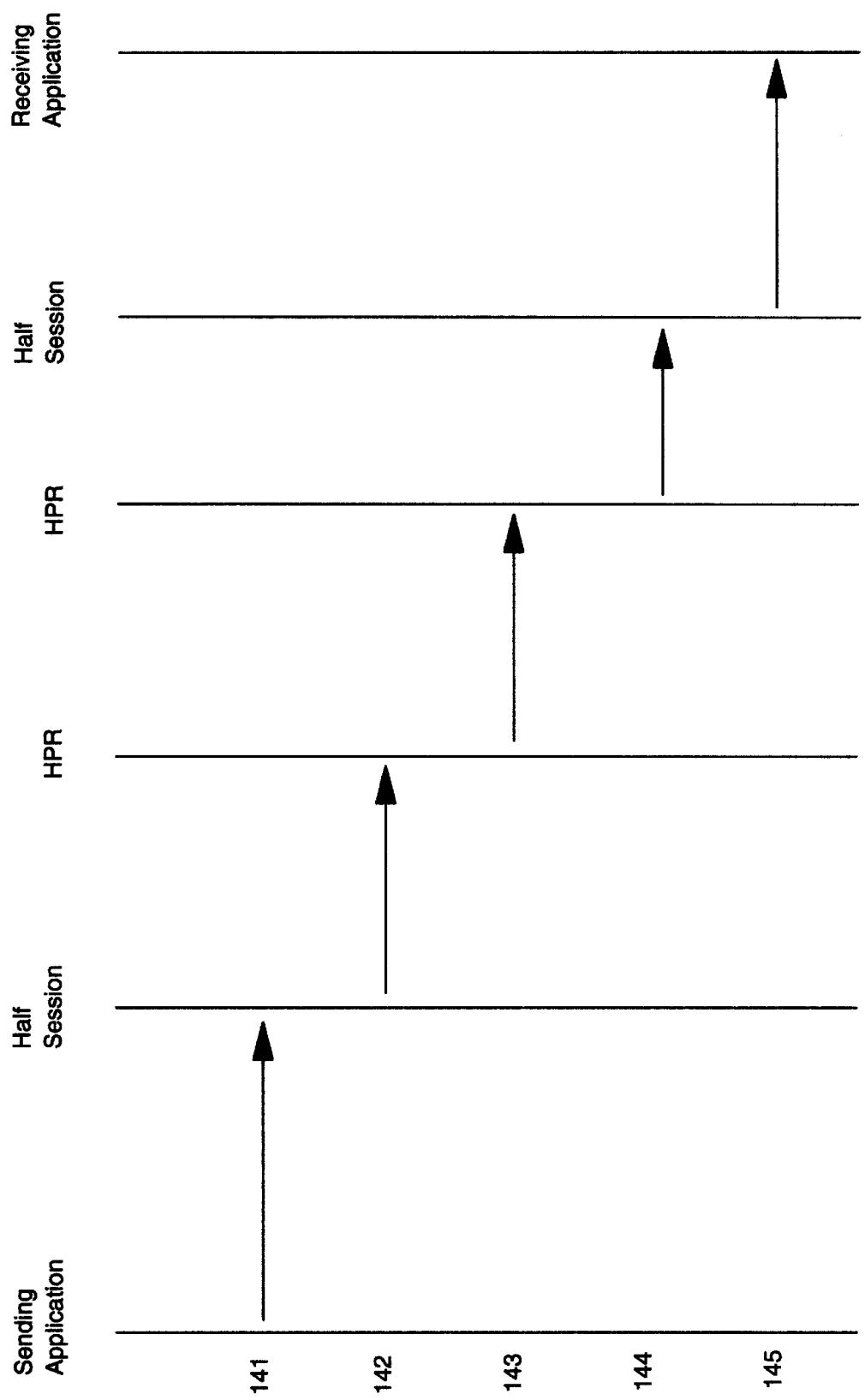
FIG. 12 is a flow illustrating the sending and receiving of data from a sending application to a receiving application utilizing the present invention.

FIG. 12 describes the flow for sending and receiving data from a Sending Application and a Receiving Application. For purposes of illustration, the sending and receiving applications are both persistent applications on VTAMs with access to the CF such that one data transmission may illustrate both the sending and receiving actions. The various actions are listed as 141 through 145 in FIG. 12.

In entry 141, the half-session tells the HPR layer the current status to be saved when the Network Layer Packet (NLP) is saved in the CF after updating to reflect the status of the data just received from the application and then sends that data to the HPR layer. The HPR layer saves the data and the updated status in the CF before sending the data into the network (entry 142). In entry 143, the status of the connection is updated to include the received NLP and then the updated status, the RH, and 5 bytes of the RU are saved in the CF. After the CF write the HPR layer can acknowledge receipt of the data. Also after the CF write the data is forwarded to the Half-Session. When the Half-Session receives the data from the HPR layer there is no action required (entry 144). Just before delivering the data to the application, the Half-Session saves the updated status in the CF (entry 145).

Figure 13:
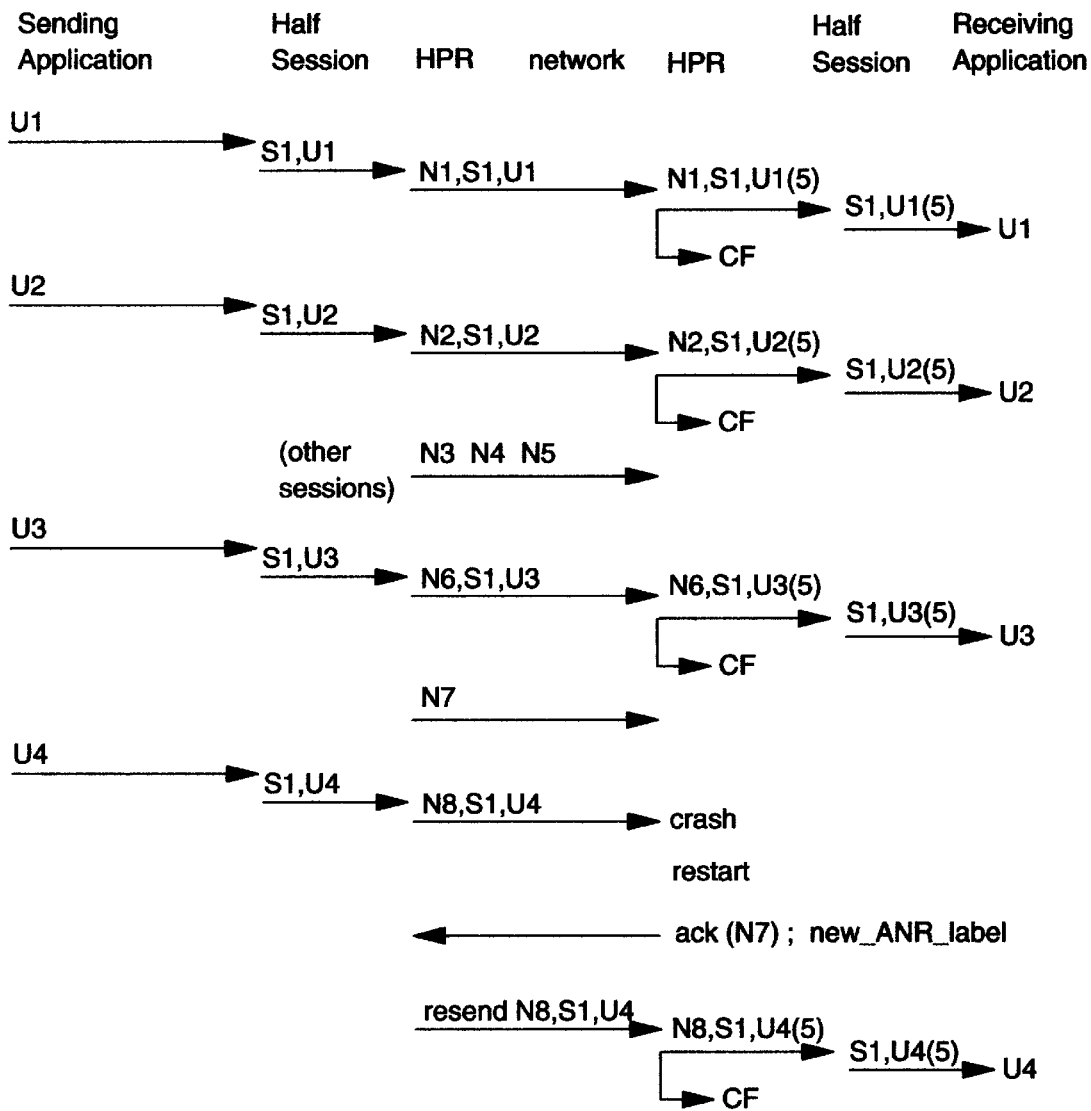
FIG. 13 is a flow illustrating the flow of data during normal operation and error recovery according to the present invention.

FIG. 13 illustrates the message flow for normal messages and in recovery. In FIG. 13 U1 through U4 represent user or application messages, CF represent the coupling facility, U1(5) through U4(5) represents the first 5 bytes of the corresponding user message, S1 represents the session information and status information for the session between the two applications and N1 through N8 represent HPR NLPs.

Referring to FIG. 13, in the normal case, the Sending Application passes the first message (RU represented by U1) to the Half-Session, which adds session information (RH, represented by S1) to the user data. The HPR layer adds RTP information (NLPs) (N1) and sends the data to its partner. The receiving HPR saves the NLP, session information, 5 bytes of user data in the CF before sending the data (session and user only) to the Half-Session. In the flow illustrated in FIG. 13, it is assumed that the only status the Half-Session saves in the CF is an indication that the data has been delivered to the Application. This indicates that the data should not be delivered to the application again and informs the HPR layer that the data is no longer needed and the CF storage can be reused.

User message 2 (U2) flows similarly to the first message. Note that data for other sessions may flow over the RTP pipe. In the example in FIG. 13, NLP 3, 4, and 5 (N3, N4 and N5) carry other sessions, data. User message 3 (U3) in N6 is then sent followed by other session data (N7). In the example in FIG. 13, when the HPR layer is sending user message 4 (U4) in N8, the receiving VTAM fails, thus N8 is not received. When the application is restarted, the CF indicates that the last NLP received was N7. The HPR layer acknowledges the last NLP and also indicates the new path to the application. N8 is re-sent and normal data flow resumes.

As used herein the term "arbitrarily selected" refers to the selection of endpoint nodes without regard to whether the endpoint node is a dedicated backup node. Thus, an arbitrarily selected node may be selected based upon considerations such as load balancing, performance or other characteristics of the node and still be arbitrarily selected.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of error recovery in a network having a first application associated with a first endpoint node and a second application associated with a second endpoint node wherein the first endpoint node and the second endpoint node are connected through the network, the method comprising the step of:

detecting a failure of the first endpoint node; and non-disruptively switching from the first application associated with the first endpoint node to a third endpoint node arbitrarily selected from existing endpoint nodes, responsive to the detection of a failure of the first endpoint node, when the first endpoint node is no longer available to the second application associated with the second endpoint node so as to reestablish the first application on the third endpoint node in substantially the same state the first application had on the first endpoint node.

2. A method according to claim 1 wherein said step of non-disruptively switching comprises the steps of:

storing state information associated with the first application; and initiating the first application at the third endpoint node utilizing the stored state information associated with the first application.

3. A method according to claim 2, further comprising the steps of:

revising the path between the second application and the first application to reflect the first application being associated with the third endpoint node; and updating the second endpoint node with information regarding the revised path between the second application and the first application.

4. A method according to claim 2, wherein the first endpoint node and the third endpoint node are nodes within a SYSPLEX and wherein said step of storing comprises the step of storing in a coupling facility of the SYSPLEX the first application state information.

5. A method according to claim 4, wherein the first endpoint node and the third endpoint node comprise VTAM facilities and wherein said step of initiating comprises the step of initiating the first application on a VTAM facility associated with the third endpoint node.

6. A method according to claim 4, wherein said step of storing in a coupling facility comprises the steps of:

storing HPR-link information in the coupling facility;

storing session state information in the coupling facility;

storing conversation state information in the coupling facility; and storing LU Mode Table information in the coupling facility.

7. A method according to claim 4, wherein the first application is a persistent session enabled application.

8. A method according to claim 2, further comprising the step of maintaining the state information for only a predetermined time.

9. A method of non-disruptively transferring a first application from a first VTAM facility to a second VTAM facility, the method comprising the steps of:

storing state information associated with the first application in a coupling facility accessible to both the first and the second VTAM facilities;

accessing the coupling facility to retrieve the state information associated with the first application; and initiating the first application on the second VTAM facility utilizing the state information retrieved from the coupling facility so as to provide the first application on the second VTAM facility in substantially the same state as the first application on the first VTAM facility.

10. A method according to claim 9, further comprising the steps of:

revising a path between a second application and the first application to reflect the first application being associated with the second VTAM facility; and updating an endpoint node associated with the second application to reflect the revised path between the second application and the first application.

11. A method according to claim 9 further comprising the step of notifying VTAM facilities with access to the coupling facility of the failure of a VTAM facility with an associated persistent application.

12. A method according to claim 9, wherein said step of storing state information comprises the steps of:
  storing HPR-link information in the coupling facility;
  storing session state information in the coupling facility;
  storing conversation state information in the coupling facility; and
  storing LU Mode Table information in the coupling facility.

13. A method according to claim 12, further comprising the step of removing outdated state information from the coupling facility.

14. A method according to claim 9, wherein the first application is a persistent session enabled application.

15. A method according to claim 9, further comprising the steps of:
  maintaining current state information for the first application in the coupling facility for a predetermined time; and
  removing state information from the coupling facility if the first application terminates.

16. A method according to claim 9, further comprising the step of dynamically selecting the second VTAM facility from existing VTAM facilities.

17. A system for error recovery in a network, the system comprising:
  a first application associated with a first endpoint node;
  a second application associated with a second endpoint node;
  means for detecting a failure of the first endpoint node; and
  means, responsive to the means for detecting, for non-disruptively switching from the first application associated with the first endpoint node to a third endpoint node arbitrarily selected from existing endpoint nodes when the first endpoint node is no longer available to the second application associated with the second endpoint node so as to reestablish the first application on the third endpoint node in substantially the same state the first application had on the first endpoint node.

18. A system according to claim 17 wherein said means for nondisruptively switching comprises:
  means for storing state information associated with the first application; and
  means for initiating the first application at the third endpoint node utilizing the stored state information associated with the first application.

19. A system according to claim 18, further comprising:
  means for revising the path between the second application and the first application to reflect the first application being associated with the third endpoint node; and
  means for updating the second endpoint node with information regarding the revised path between the second application and the first application.

20. A system according to claim 18, wherein the first endpoint node and the third endpoint node are nodes within a SYSPLEX and wherein said means for storing comprises means for storing in a coupling facility of the SYSPLEX the first application state information.

21. A system according to claim 20, wherein the first endpoint node and the third endpoint node comprise VTAM facilities and wherein said means for initiating comprises means for initiating the first application on a VTAM facility associated with the third endpoint node.

22. A system according to claim 20, wherein said means for storing in a coupling facility comprises:
  means for storing HPR-link information in the coupling facility;
  means for storing session state information in the coupling facility;
  means for storing conversation state information in the coupling facility; and
  means for storing LU Mode Table information in the coupling facility.

23. A system according to claim 20, wherein the first application is a persistent session enabled application.

24. A system according to claim 18, further comprising means for maintaining the state information for only a predetermined time.

25. A system for non-disruptively transferring a first application from a first VTAM facility to a second VTAM facility comprising:
  means for storing state information associated with the first application in a coupling facility, wherein the means for storing state information is accessible to both the first and the second VTAM facility;
  means for accessing the coupling facility to retrieve the state information associated with the first application; and
  means for initiating the first application on the second VTAM facility utilizing the state information retrieved from the coupling facility so as to provide the first application on the second VTAM facility in substantially the same state as the first application on the first VTAM facility.

26. A system according to claim 25, further comprising:
  means for revising a path between a second application and the first application to reflect the first application being associated with a third VTAM facility; and
  means for updating an endpoint node associated with the second application to reflect the revised path between the second application and the first application.

27. A system according to claim 25 further comprising means for notifying VTAM facilities with access to the coupling facility of the failure of a VTAM facility with an associated persistent application.

28. A system according to claim 25, wherein said means for storing state information comprises:
  means for storing HPR-link information in the coupling facility;
  means for storing session state information in the coupling facility;
  means for storing conversation state information in the coupling facility; and
  means for storing LU Mode Table information in the coupling facility.

29. A system according to claim 28, further comprising means for removing outdated state information from the coupling facility.

30. A system according to claim 25, wherein the first application is a persistent session enabled application.

31. A system according to claim 25, further comprising:
  means for maintaining current state information for the first application in the coupling facility for a only a predetermined time; and
  means for removing state information from the coupling facility if the first application terminates.

32. A system according to claim 25, further comprising means for dynamically selecting the second VTAM facility from existing VTAM facilities.

33. A computer program product for error recovery in a network having a first application associated with a first endpoint node and a second application associated with a second endpoint node, the computer program product comprising:

a computer-readable storage medium having computer-readable program code means embodied in said medium, said computer-readable program code means comprising:

computer program code means for determining if the first endpoint node is available to the second application; and computer program code means, responsive to the computer program code means for determining, for non-disruptively switching from the first application associated with the first endpoint node to a second application associated with a third endpoint node when the first endpoint node is no longer available to the second application associated with the second endpoint node.

34. A computer program product according to claim 20 wherein said computer readable program code means for non-disruptively switching comprises:

computer readable program code means for storing state information associated with the first application; and computer readable program code means for initiating the first application at the third endpoint node utilizing the stored state information associated with the first application.

35. A computer program product according to claim 34, further comprising:

computer readable program code means for revising the path between the second application and the first application to reflect the first application being associated with the third endpoint node; and computer readable program code means for updating the second endpoint node with information regarding the revised path between the second application and the first application.

36. A computer program product according to claim 34, wherein the first endpoint node and the third endpoint node are nodes within a SYSPLEX and wherein said computer readable program code means for storing comprises computer readable program code means for storing in a coupling facility of the SYSPLEX the first application state information.

37. A computer program product according to claim 36, wherein the first endpoint node and the third endpoint node comprise VTAM facilities and wherein said computer readable program code means for initiating comprises computer readable program code means for initiating the first application on a VTAM facility associated with the third endpoint node.

38. A computer program product according to claim 36, wherein said computer readable program code means for storing in a coupling facility comprises:

computer readable program code means for storing HPR-link information in the coupling facility;

computer readable program code means for storing session state information in the coupling facility;

computer readable program code means for storing conversation state information in the coupling facility; and computer readable program code means for storing LU Mode Table information in the coupling facility.

39. A computer program product according to claim 36, wherein the first application is a persistent session enabled application.

40. A computer program product according to claim 34, further comprising computer readable program code means for maintaining the state information for only a predetermined time.

41. A computer program product for non-disruptively transferring a first application from a first VTAM facility to a second VTAM facility, the computer program product comprising:

a computer-readable storage medium having computer-readable program code means embodied in said medium, said computer-readable program code means comprising:

computer program code means for storing state information associated with the first application in a coupling facility accessible to both the first and the second VTAM facility;

computer program code means for accessing the coupling facility to retrieve the state information associated with the first application; and computer program code means for initiating the first application on the second VTAM facility utilizing the state information retrieved from the coupling facility so as to provide the first application on the second VTAM facility in substantially the same state as the first application on the first VTAM facility.

42. A computer program product according to claim 41, further comprising:

computer readable program code means for revising a path between a second application and the first application to reflect the first application being associated with a third VTAM facility; and computer readable program code means for updating an endpoint node associated with the second application to reflect the revised path between the second application and the first application.

43. A computer program product according to claim 41 further comprising computer readable program code means for notifying VTAM facilities with access to the coupling facility of the failure of a VTAM facility with an associated persistent application.

44. A computer program product according to claim 41, wherein said computer readable program code means for storing state information comprises:

computer readable program code means for storing HPR-link information in the coupling facility;

computer readable program code means for storing session state information in the coupling facility;

computer readable program code means for storing conversation state information in the coupling facility; and computer readable program code means for storing LU Mode Table information in the coupling facility.

45. A computer program product according to claim 44, further comprising computer readable program code means for removing outdated state information from the coupling facility.

46. A computer program product according to claim 41, wherein the first application is a persistent session enabled application.

47. A computer program product according to claim 41, further comprising:

computer readable program code means for maintaining current state information for the first application in the coupling facility for a only a predetermined time; and computer readable program code means for removing state information from the coupling facility if the first application terminates.

48. A computer program product according to claim 41, further comprising computer readable program code means for dynamically selecting the second VTAM facility from existing VTAM facilities.

* * * * *

UNITED STATES PATENT AND TRADEMARK OFFICE
CERTIFICATE OF CORRECTION

PATENT NO. : 6,061,807
DATED : May 9, 2000
INVENTOR(S) : Mark Albert, Ray W. Boyles, James L. Hall, Barron Cornelius Housel, III It is certified that error appears in the above-identified patent and that said Letters Patent is hereby corrected as shown below:

On the Cover Page:
The title should read as follows:
   Methods, Systems and Computer Program Products for Error Recovery of Endpoint Nodes In the Claims:
Claim 31, line 3 should read as follows:
   -- first application in the coupling facility for only a --
Claim 34, line 1 should read as follows:
   -- 34. A computer program product according to claim 33 --
Claim 47, line 5 should read as follows:
   -- coupling facility for only a predetermined time; and --

Signed and Sealed this

First Day of May, 2001

Attest:

NICHOLAS P. GODICI

Attesting Officer     Acting Director of the United States Patent and Trademark Office